(12) United States Patent
Burns

(10) Patent No.: US 6,870,564 B1
(45) Date of Patent: Mar. 22, 2005

(54) IMAGE PROCESSING FOR IMPROVEMENT OF COLOR REGISTRATION IN DIGITAL IMAGES

(75) Inventor: Peter D. Burns, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/406,882

(22) Filed: Sep. 28, 1999

Related U.S. Application Data

(60) Provisional application No. 60/102,786, filed on Oct. 2, 1998.

(51) Int. Cl.$^7$ .................... H04N 9/093; H04N 5/228; G06K 9/32
(52) U.S. Cl. ............... 348/263; 348/222.1; 382/294
(58) Field of Search .................. 348/222.1, 263, 348/262, 264, 265, 187, 267, 268, 270; 382/294, 151, 162, 167; 358/448, 450; H04N 9/093

(56) References Cited

U.S. PATENT DOCUMENTS

| | | | | |
|---|---|---|---|---|
| 4,849,914 A | | 7/1989 | Medioni et al. | 382/112 |
| 4,890,160 A | * | 12/1989 | Thomas | 348/429.1 |
| 5,315,413 A | * | 5/1994 | Yamamoto et al. | 358/512 |
| 5,325,190 A | | 6/1994 | Nagasaki et al. | 348/270 |
| 5,475,428 A | | 12/1995 | Hintz et al. | 348/263 |
| 6,002,434 A | * | 12/1999 | Topper | 348/263 |
| 6,075,905 A | * | 6/2000 | Herman et al. | 382/284 |
| 6,373,970 B1 | * | 4/2002 | Dong et al. | 382/128 |
| 2001/0030697 A1 | * | 10/2001 | Dischert et al. | 348/263 |

OTHER PUBLICATIONS

Hubel et al., Spatial Frequency Response of Color Image Sensors: Bayer Color Filters and Foveon X3, Foveon, Inc., pp. 1–4.*

"Fundamentals of Digital Image Processing" by Anil K. Jain. Prentice–Hall International, Inc., pp. 244–263.

Design of Constrained Digital Filters for Restoration and Enhancement: by Stephen K. Park and Stephen E. Reichenbach. The Society for Imaging Science and Technology, May 20–25, 1990. pp. 242–244.

"The design of 2–D approximately linear phase filters using a direct approach" by Stuart Lawson and Martin Anderson. *Signal Processing 57*, pp. 205–221, 1997.

*Optics*, 2$^{nd}$ ed., Addison–Wesley Publishing Co.: Reading, Massachusetts, pp. 232–233, 1987.

"Electronic Still Picture Camera Spatial Frequency Response Measurement" by Timothy A. Fischer and Jack Holm. *Proc. of IS&T 47$^{th}$ Annual Conf., ICPS 1994*, vol. 2. pp. 626–630 (1994).

"Benchmarking of the ISO 12233 Slanted–edge Spatial Frequency Response Plug–in" by Don Williams. *Proc. of IS&T Annual Conf.*, (1998).

* cited by examiner

*Primary Examiner*—Wendy R. Garber
*Assistant Examiner*—Justin Misleh
(74) *Attorney, Agent, or Firm*—Peyton C. Watkins

(57) ABSTRACT

A method for improving the wavelength dependent registration of digital images includes the steps of (a) detecting a similar feature in two or more digital records of the same scene, (b) determining from the feature a shift due to misregistration of at least one of the digital records relative to another of the digital records, and (c) processing the shifted digital record(s) with a digital filter having a phase response that compensates for the shift, thereby providing a correction for the wavelength dependent misregistration between the digital records.

35 Claims, 7 Drawing Sheets

IMAGE PROCESSING FOR IMPROVEMENT OF COLOR REGISTRATION IN DIGITAL IMAGES

CROSS REFERENCE TO RELATED APPLICATION

Reference is made to and priority claimed from U.S. Provisional Application Ser. No. 60/102,786, filed 2 Oct. 1998, entitled "Image Processing for Improvement of Color Registration in Digital Images".

FIELD OF THE INVENTION

The invention relates generally to the field of digital image processing, and in particular to the digital correction of misregistration in a sequence of different color, or other multi-record images captured of the same scene.

BACKGROUND OF THE INVENTION

The acquisition of digital color images by, e.g., a digital camera, a film scanner or a document scanner, results in several (usually three) stored color records. These records represent different spectral weightings of the image information. When a digital color image is displayed on a CRT or printed, these color records supply the red, green and blue image information. The combination of the color records at each pixel across the image can give the viewer an impression of a color image, similar to that of the original scene or document.

The recording of detail in a digital color image requires that the color records be detected and stored in register. By this we mean that the signals stored as triplets of red, green and blue pixel values should indeed correspond to the sampled original image at the same locations. If a digital image is captured with misregistration between the color records, the color image displayed or printed from these records can exhibit a loss of sharpness (blur) or color distortion artifacts, particularly at the edges of objects in the scene. Extreme cases are sometimes seen in color images printed in newspapers. In addition, the performance of any subsequent image processing step that relies on the color records being registered correctly, such as color metric transformation, image compression, and printing suffers when color misregistration is present.

Color misregistration can have several sources. Chromatic aberration in the optical path prior to image detection can cause the focal plane and image position to be a function of wavelength (see, e.g., E. Hecht, *Optics*, $2^{nd}$ ed, Addison-Wesley Publishing Co: Reading, Mass., pp. 232–233, 1987). This 'lateral color' error can result in, e.g., a simple translation and/or a variation in optical magnification between the color records. For film or document scanners that use a line-scan detector, mechanical and electronic timing and manufacturing tolerances can lead also to translation misregistration.

Another source of color misregistration is the absence of knowledge of consistent coordinates for all color records. This can occur when the input image color records are recorded on, e.g., different film separations. Typically the digital records are manipulated by estimating corresponding locations using registration elements added to the border of the original film images. This usually requires a skilled operator manipulating the digital image records, or a mechanical registration prior to scanning. It is also possible to evaluate the degree of color aberration in an optical system by specialized testing of the optical elements. The net effect of these characteristics, when combined with image detection and signal readout, requires measurement from the actual digital image as stored. It is further possible to measure the misregistration between color records by the use of a technique based on acquiring an image of an edge. This method also estimates the net misregistration directly from the digital image.

Prior art methods for bringing image color-records into registration include manual processes for detecting such common features in each record. Such processes may be practiced by having an operator view the digital image information on, e.g., a computer monitor. For example, in U.S. Pat. No. 4,849,914, two separate areas on halftone separation film are scanned, where each separation is an image color-record. The corresponding areas on each film must contain the same image feature (e.g., an edge or line). Image processing is performed to detect the location of corresponding edge features, and from these the shift and rotation necessary to bring the physical film separations into alignment are computed. These parameters are then used by a machine that moves the film separations into alignment for punching pin registration holes.

Digital image processing methods for re-registering color images also include estimating the amount of misregistration, followed by a correction step. In U.S. Pat. No. 5,475,428, the color misregistration is detected using a correlation-type operation on the image data from a digital camera. The correction step, also called resampling, is achieved first by shifting the image records for integer pixels, then by performing a bilinear interpolation for the remaining fractional values. Interpolation is also taught in U.S. Pat. No. 5,325,190 for both time-sequence image records and color misregistration correction.

The application of digital Finite Impulse Response (FIR) filters in digital image processing is quite common, and done by a convolution operation (see, e.g., A. K, Jain, *Fundamentals of Digital Image Processing*, Prentice-Hall, pp. 244–260, 1989). The design of a digital filter for, say noise reduction or sharpening, results in a filter matrix (or matrices) of coefficients that are then used in the convolution operation on the image data. The desired characteristics of an FIR filter are usually expressed in the Fourier transform domain in terms of a Modulation Transfer Function (MTF). The procedure is to design a filter (matrix) whose MTF approximates the desired response, with as small a size as possible. A large filter size (n by m matrix) implies a high computational cost.

The Discrete Fourier Transform (DFT) is a mathematical operation that allows the transformation of the filter matrix (in the image domain) to an equivalent MTF description in the frequency domain. It is natural to design FIR filters using the DFT, as shown, e.g., in S. K. Park and S. E. Reichenbach, *Proc. SPSE Annual Conf.*, pp. 242–244, 1990. The DFT, however, results in a complex representation (with real and imaginary parts) of the filter operation. This implies that an FIR filter has both an MTF and a Phase Transfer Function (PTF). If the filter matrix is constrained to be symmetrical about its center (in two directions) this results in a linear-phase design. This implies that the filter PTF will introduce a simple image shift, which in most cases for digital images can be ignored.

There is a class of digital filters, however, that are designed specifically to have both a specified MTF and PTF. These are used in networks called parallel combinations of all pass subfilters (PCAS). These subfilters are designed to have a unity MTF and a given PTF. When used in combination, the net effect is a filter operation that has a designed (non-unity) MTF and approximately linear PTF (see, e.g., S. Lawson and M. Anderson, *Signal Processing*, 57: pp. 205–221, 1997). Notwithstanding such signal processing designs, current FIR filters used to process digital images are not designed for a desired phase response, nor for both desired phase and modulus responses. These filters, moreover, are not used or suggested for color misregistration correction.

SUMMARY OF THE INVENTION

The present invention is directed to overcoming one or more of the problems set forth above. Briefly summarized, according to one aspect of the present invention, a method for improving the wavelength dependent registration of digital images includes the steps of (a) detecting a similar feature in two or more digital records of the same original, (b) determining from the feature a shift due to misregistration of at least one of the digital records relative to another of the digital records, and (c) processing the shifted digital record(s) with a digital filter having a phase response that compensates for the shift, thereby providing a correction for the color misregistration between the wavelength dependent digital records.

The invention thus resides in a digital image processing method wherein an measurement of the translation error between, e.g., color records is computed from the actual acquired image. These translation errors are then used to directly design (or select from pre-computed), Finite Impulse Response (FIR) filters that will restore the image color registration. The designed FIR filters are consistent with the current practice of improving the sharpness of digital images by increasing certain spatial frequencies in the image during filtering. They are also consistent with low-pass filters used for noise reduction. The proposed filters accomplish this "sharpening" or "blurring" and color registration simultaneously.

This invention includes the application of color misregistration data to define a desired phase response of a digital FIR filter for each color-record of the digital image, and the design of an FIR filter with both a desired modulus (MTF) response and a color-specific phase response. Thus, unlike the methods that require interpolation to correct color misregistration, the advantage of the claimed invention resides in its achievement of its goal without any additional computation, other than would be done routinely as part of image filtering. Thus normal (MTF-specified) filtering and color registration correction are accomplished in a single operation.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the description as set forth in the following specification, all software implementation thereof is conventional and within the ordinary skill in such arts.

Still further, as used herein, the software program may be stored in a computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 10:
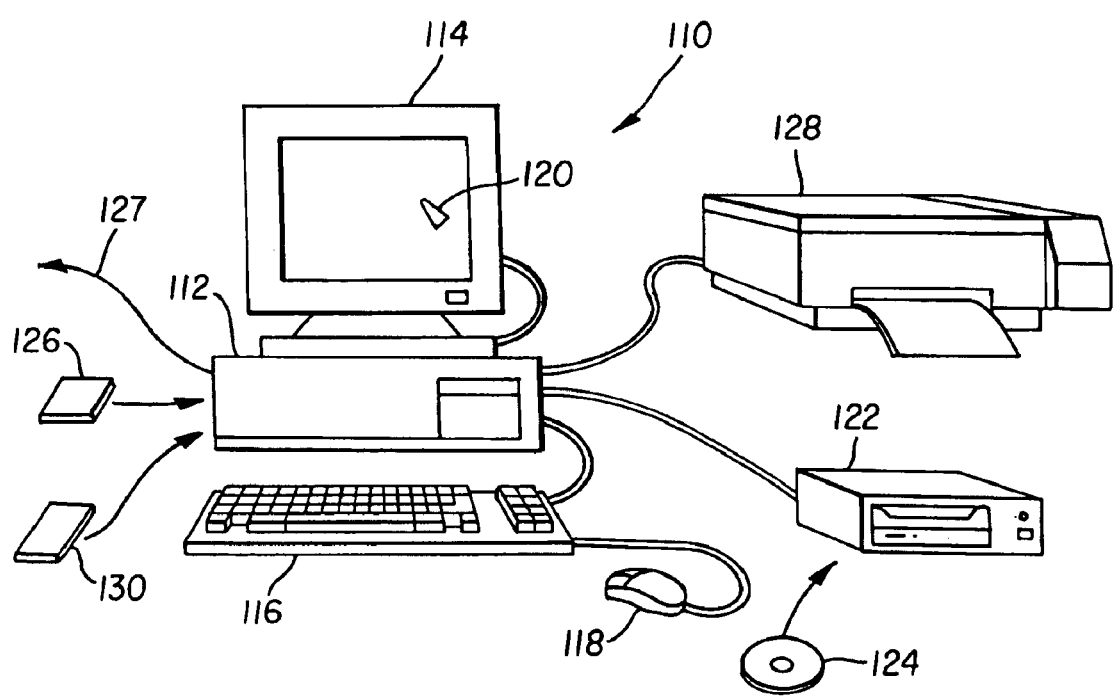
FIG. 10 is a perspective diagram of a computer system for implementing the present invention.

Referring first to FIG. 10, there is illustrated a computer system 110 for implementing the present invention. Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs and for performing other processing functions. A display 114 is electrically connected to the microprocessor-based unit 112 for displaying user-related information associated with the software. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 16 or the compact disk 124, or input through the network connection 127, may have been obtained from a variety of sources, such as a digital camera (not shown) or a scanner (not shown).

Correction of color misregistration is compensation for error introduced during the image acquisition. The error can be influence by optical, electronic and signal processing elements in the imaging path. In order to compensate for misregistration error between color records, it is first necessary to estimate the degree of correction to be applied. This can be measured by acquiring a digital color image for a scene or target having one or more features with known characteristics. In the descriptions that follows, the features of interest are a neutral (having red, green and blue spectral components) registration element or a slanted edge with a moderate to sharp transition on the scale at which the image sampling is to be applied. It is also possible to estimate the amount of color registration from various other image features, such as traditional cross-hairs ('+'), or edges oriented in other ways.

Figure 1:
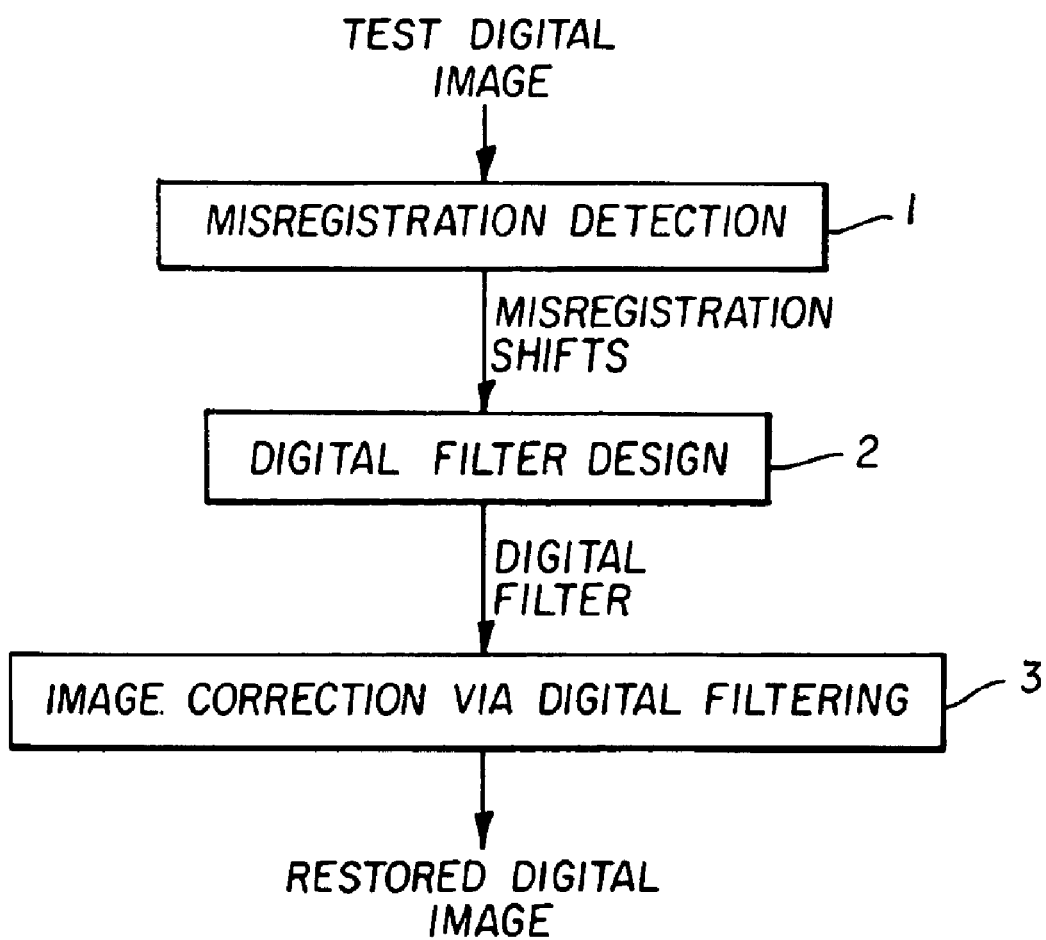
FIG. 1 is an overview of the procedure for correcting color misregistration in digital images according to the invention.

FIG. 1 shows three stages of digital image processing involved in the correction of color misregistration. The first stage is a detection stage 1 wherein the amount of misregistration error between the color-records of a digital image is estimated. Two methods for this are discussed below. A second stage 2 includes the design of one or more digital filters with desired MTF (for sharpening, noise reduction, etc.) and PTF (for applying a correction for color misregistration). A third stage 3 includes the application of the designed digital filter to the color-records of the digital image. This latter stage is commonly available in most systems for digital image processing, but not used for the purposes of the claimed invention.

After a digital image is acquired from an original, such as a scene or document, as several fully populated image arrays, the characteristics of the misregistration can be estimated from those records by utilizing one of several detection techniques, as follows. In a first technique for estimating misregistration, a known feature, e.g., a graphical element in the shape of a '+', is contained in the digital image, and isolation of the pixels corresponding to this element can be analyzed in each color record. The analysis can be used to compute a location statistic. If this statistic is a reliable estimate of the relative position (i.e. (x,y) location) of, say, the center of the '+', then a comparison of the statistic for each color record yields the measure of misregistration.

One approach is to compute a simple centroid of the '+' feature. This is done in one dimension as follows, $$c(h) = \frac{1}{N}\sum_{i=1}^{N} ih(i)$$

where h(i) is the N-length array of image pixel data. If computed for both image dimensions, the two centroid coordinates are found. By comparing the centroid coordinates for each color record a measure of translation error is obtained. This is often stated with respect to the coordinates of the green record, e.g.

|  | Misregistration | |
| --- | --- | --- |
| Record | x | y |
| red | 0.27 | −0.81 |
| green | 0.00 | 0.00 |
| blue | −0.51 | −0.78 | in units of pixel distance.

The use of this method with a single feature in the image yields a measure of color record translation. If misregistration includes image rotation or magnification, then it is possible to estimate the extent of these by including the feature at several locations, by comparing the corresponding centroid locations. For example if two features are used, it is possible to estimate a measure rotation and translation by fitting a linear equation to the two sets of loci per color record.

Figure 2:
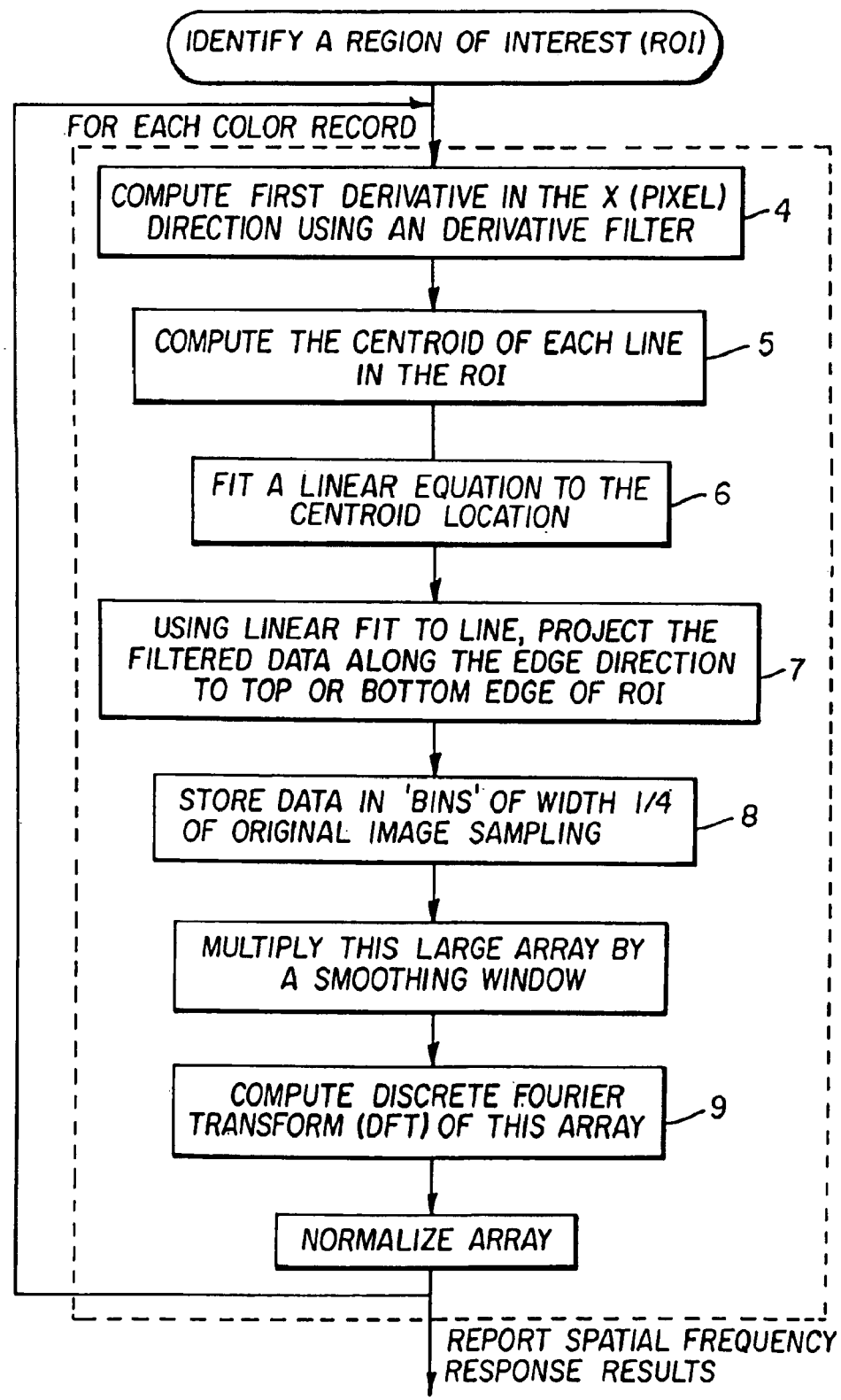
FIG. 2 is a diagram of steps involved in the misregistration detection stage shown in FIG. 1.

In a second technique for estimating misregistration, a robust measure of color image translation and rotation error can be computed as a natural step of a well-established procedure for the evaluation of digital cameras. The ISO 12233 standard (see also T. A. Fischer and J. Holm, "Electronic Still Picture Camera Spatial Frequency Response Measurement", *Proc. of IS&T 47th Annual Conf/ICPS* 1994, vol. 2, pp. 626–630 (1994) and D. Williams, "Benchmarking of the ISO 12233 slanted-edge spatial frequency response plug-in", *Proc. of IS&T Annual Conf.*, (1998)) for evaluating the spatial frequency response of digital cameras describes the use of a slanted edge target feature. While the ISO 12233 procedure was not intended as a technique for measuring color misregistration, and its use for this purpose is not mentioned or taught in any publication prior to this application, it has been found to provide a robust measure of misregistration. The steps included in the ISO12233 procedure are outlined in FIG. 2, where the edge is assumed to be oriented in a near-vertical direction. In summary, the procedure uses the gradient (initially computed in a step 4) of a slanted edge to derive a super-sampled profile of the edge (derived in step 7 and stored in data "bins" in step 8) for use in deriving (in a transform step 9) a spatial frequency response via edge gradient analysis. To do so, however, the edge location and direction (in the form of an linear equation) are estimated. Note that at step 6 the equation is fit to the location of the centroid of each line of the edge derivative, as calculated in previous steps 4 and 5. An implementation of this method that provides this fit for each color record is used as a direct measure of edge location within the N×M region of interest (ROI). Specifically, the equation for the linear fit to the set of line centroid data can be expressed as the inverse of the usual linear equation $$x=a+b(y-1)$$

where x is the x-direction (pixel) location, y the y-direction (line) number [1, 2, . . . ] and a, b are constants. The value of a is the location of the edge on the first line of the region of interest (ROI), which in this case is the slanted edge target feature. The value of b gives a measure of the edge slope—an indication of misregistration due to rotation. Since the ROI is chosen to be identical for each color record, the corresponding values of a and b are expressed in the same coordinates and their difference indicates the degree of misregistration. The above procedure was implemented in software and tested. The results were found to give accurate and reliable estimates of the color record translation error.

A common step in most digital imaging systems is the implementation of a digital filter aimed at manipulating spatial image information, e.g., to selectively enhance certain content to improve perceived sharpness, or suppress other content to reduce noise or artifacts. Digital filters are also used in conjunction with image resampling and compression procedures. The most common digital filter is the symmetrical (or linear phase) Finite Impulse Response (FIR) filter which is implemented as a discrete convolution. The filtered signal is $$y_{i,j} = \sum_{k=N/2}^{N/2} \sum_{l=-M/2}^{M/2} x_{k,l} h_{i-k,j-l}$$

where $x_{i,j}$ is the input image array and $h_{i,j}$ is the (N×M) array of filter coefficients. The desired characteristics of the filter are usually specified in the frequency domain and the filter design results in both the size (N×M) and the values of {h} being chosen. There are several methods for designing FIR filters which usually seek to match both a desired (modulus) spatial frequency response, a limited extent (N and M small), and to limit unwanted artifacts such as ringing over scene edges. To understand both the opportunity to design filters with a desired phase response and how this can be used to compensate for color misregistration, it is necessary to review properties of the discrete Fourier transform (DFT).

When we either specify or evaluate the properties of an FIR filter in the spatial frequency domain, we are making use of properties of the DFT. The duality of convolution and multiplication between the spatial and frequency domains makes this possible. The Fourier transform of a (real) function is in general a complex function. Since it has a real and imaginary part at each frequency, we can also represent these as a modulus and phase (angle), $$mod(Y(u)) = \sqrt{real(Y(u))^2 + imag(Y(u))^2}$$

$$phase(Y(u)) = \arctan\left(\frac{imag(Y(u))}{real(Y(u))}\right)$$

where y(u) is a complex function. If we design an FIR filter whose coefficients are symmetrical about its center coefficient, then the result is a simple shift of the image record. This is usually a good thing when applied to all color records, particularly if we have no reason to introduce a frequency-dependent phase shift into the output image. One phase modification is of interest, however, and it is motivated by a property of the Fourier transform.

The Fourier transform of a shifted function is $$F[y(x-b)]=Y(u)e^{-2ib\pi u}$$

where b is the shift (translation of +b) applied to y(x), F indicates the Fourier transform, Y(u) is the transform of the unshifted function, and u is the spatial frequency coordinate and i=$\sqrt{-1}$. We can express the effect of the shift in terms of a linear filter in the frequency domain as a multiplication by $e^{-2ib\pi u}$. Expressing this in trigonometric notation and applying the above definition for the phase of a complex function results in simple translation being equivalent to a filter with, $$modulus: |Y(u)|=1$$

$$phase: \phi(Y(u))=-2\pi bu$$

This implies that if we can design a digital filter with a phase response of 2 πbu, it would be possible to compensate for the shift in the original signal.

Figure 3:
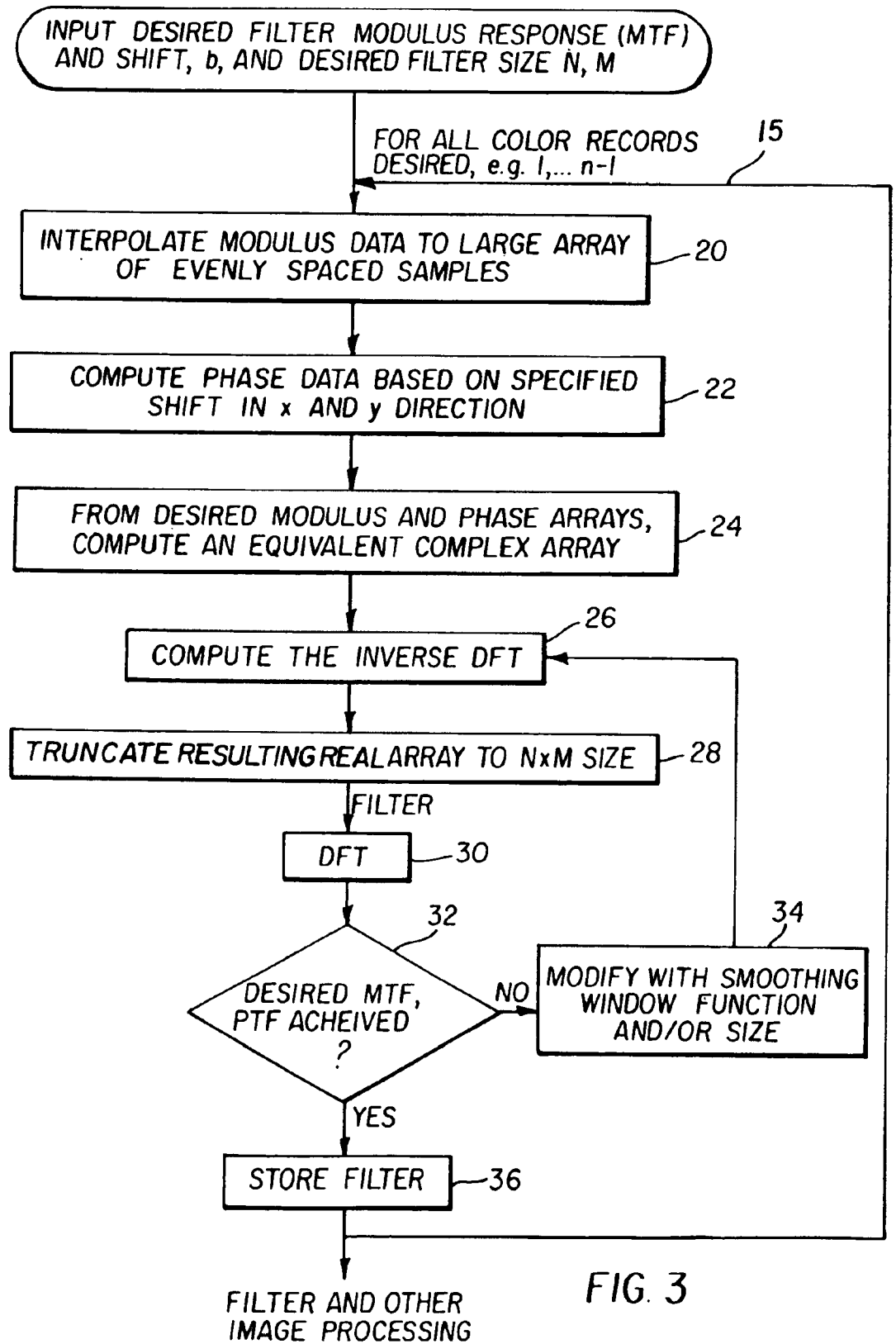
FIG. 3 is a diagram of the procedure for designing an FIR filter useful in the filtering stage shown in FIG. 1.

FIG. 3 shows the steps of a filter design procedure, which is implemented in software and based on the DFT. Based on the desired filter MTF, a large (interpolated if needed) array is used in a step 20 to store the desired modulus. The phase function corresponding to the desired shift (x,y) is then computed in a step 22. A third complex array is used in a step 24 to store the corresponding real and imaginary parts of the desired filter response. The inverse DFT is computed in a step 26 to give an initial filter design, which is then truncated in step 28 to a desired filter size. The MTF and PTF of this initially designed filter are then evaluated in step 30 using a DFT of the zero-padded version of the filter. Based on an evaluation of the resulting filter response in step 32, the array can then be multiplied by a window function in step 34, which will tend to smooth the spatial frequency response. Note that the application of a window function should be done so as not to change the symmetry that will be evident in the filter about its shifted origin. Additional designs based on varying the filter size can also be compared, and a final filter stored in step 36. The above procedure can be repeated for each color-record (15). Note that for one color-record, taken as the reference record, no shift is needed, so a zero-phase filter will be designed. This is easily accomplished in the procedure by, since the desired shift for this color-record will be zero at the output of stage 1 in FIG. 1.

One of the advantages of the invention is that misregistration and sharpnesss enhancement can be dealt with together: that is, color misregistration data can be applied to define a desired phase response of a digital FIR filter and MTF data can be applied to define a desired magnitude (modulus) response of a digital FIR filter for each color record of the digital image. Consequently, one FIR filter can be designed with both a desired modulus (MTF) response and a color-specific phase response. Thus, unlike the methods that require interpolation to correct color misregistration, the advantage of the claimed invention resides in its achievement of its goal without any additional computation, other than would be done routinely as part of conventional image filtering. Thus normal (MTF-specified) filtering and color registration correction are accomplished in a single operation. In the design process, two sets of coefficients may be derived (effectively, two digital filters)

and the final digital filter may obtained by convolving the first digital filter having a phase response that compensates for the shift with the second digital filter having a magnitude response that compensates for an aspect of the digital color records other than the shift (such as sharpness). If the possible desired shifts are finite in number (e.g., {−0.5, 0, 0.5}), the first digital filter may use a set of precalculated coefficients selected, once the shift is known, from a plurality of sets precalculated for various pixel shifts.

EXAMPLE

A filter design was specified to include sharpness enhancement defined by an aim MTF that peaked at 3.0 in the v (y) direction, and with a low-pass characteristic in the u (x) direction. In addition, an image shift of +0.5 (pixels) in the x direction was specified. The modulus and phase responses are shown in FIGS. 4 and 5.

Figure 6:
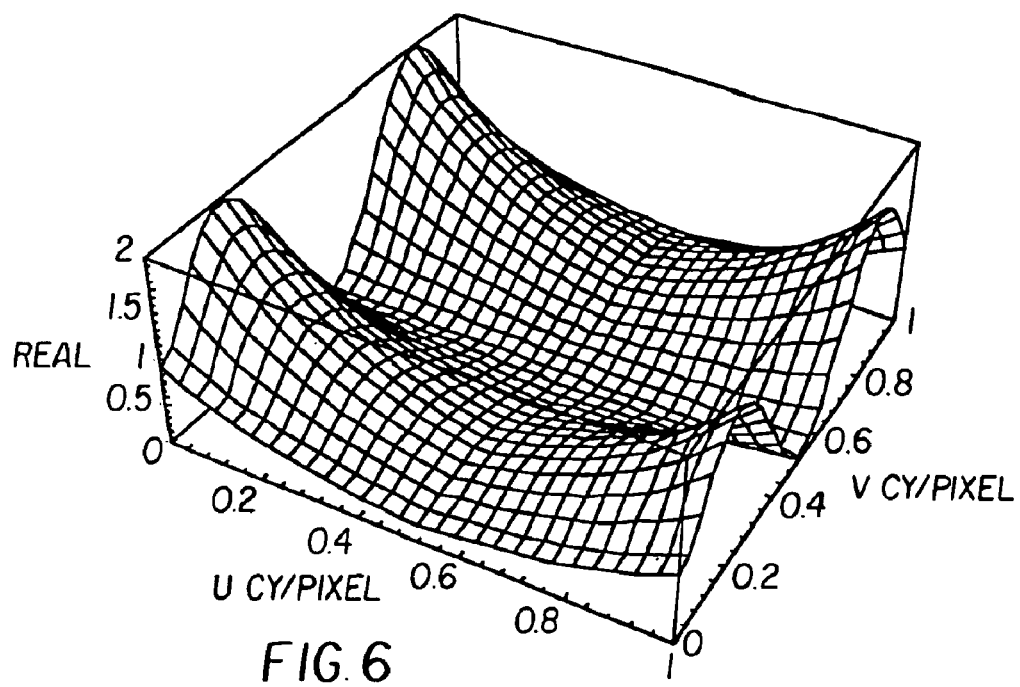
FIG. 6 is a diagram of the real part of aim filter response for the desired filter MTF and PTF.
Figure 7:
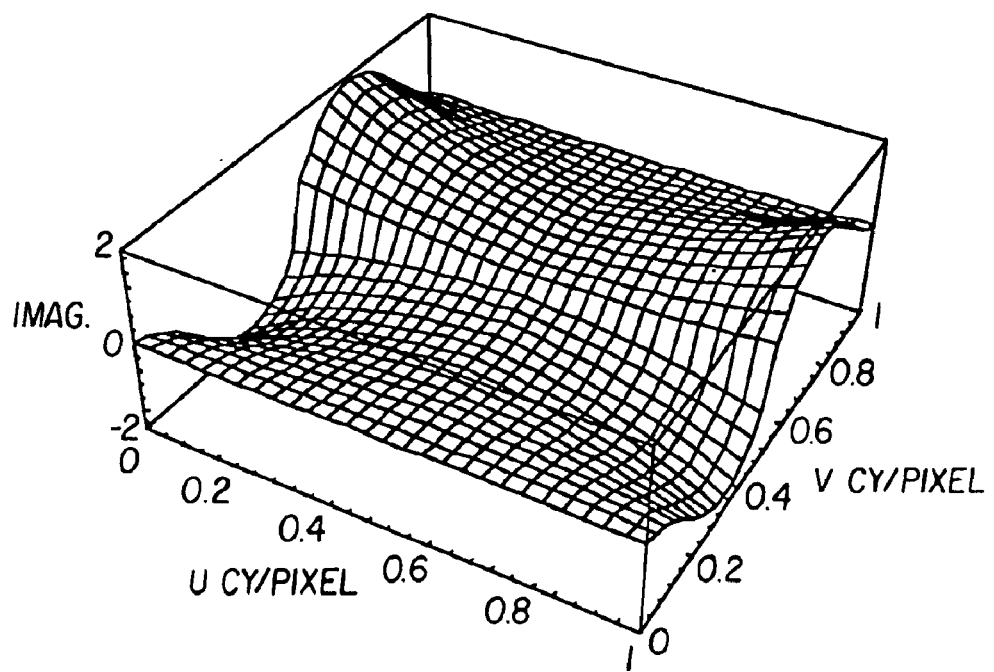
FIG. 7 is a diagram of the imaginary part of aim filter response for the desired filter MTF and PTF.

The next step is to populate a complex array with the real and imaginary parts that correspond to the above aim responses. The required symmetry in the Fourier domain (to yield a real FIR filter) has to be observed, however. This is shown in FIGS. 6 and 7. A 6×6 size filter was designed using the above techniques and no smoothing window function. The filter coefficients are $$\begin{bmatrix} -0.028 & -0.12 & -0.34 & -0.12 & -0.028 & -0.018 \\ -1. & -4.4 & -12. & -4.4 & -1. & -0.66 \\ 1.8 & 7.9 & 22. & 7.9 & 1.8 & 1.2 \\ 1.8 & 7.9 & 22. & 7.9 & 1.8 & 1.2 \\ -1. & -4.4 & -12. & -4.4 & -1. & -0.66 \\ -0.028 & -0.12 & -0.34 & -0.12 & -0.028 & -0.018 \end{bmatrix}$$

Figure 4:
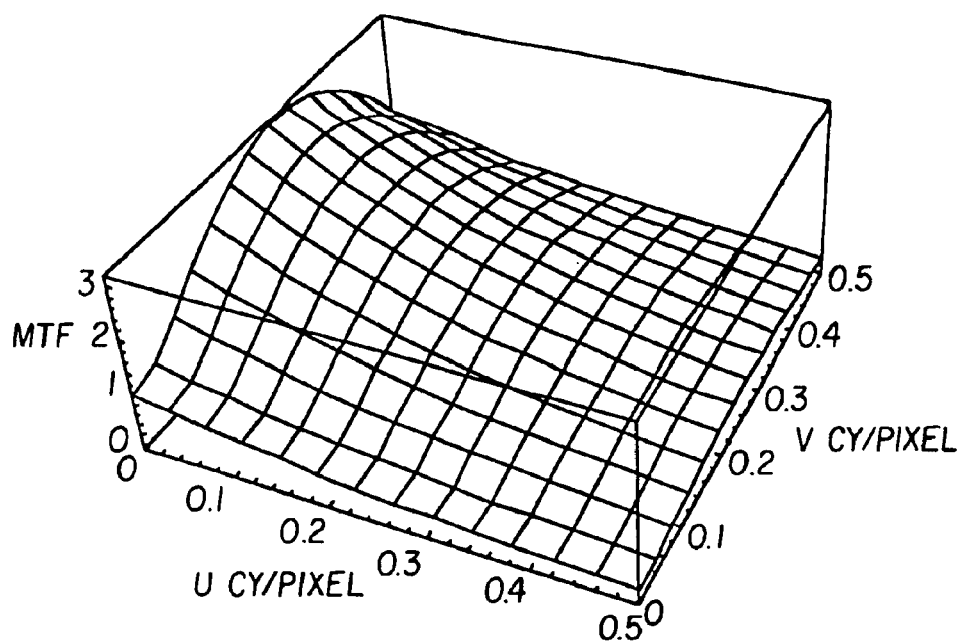
FIG. 4 is a diagram of the desired filter MTF for sharpness enhancement.
Figure 5:
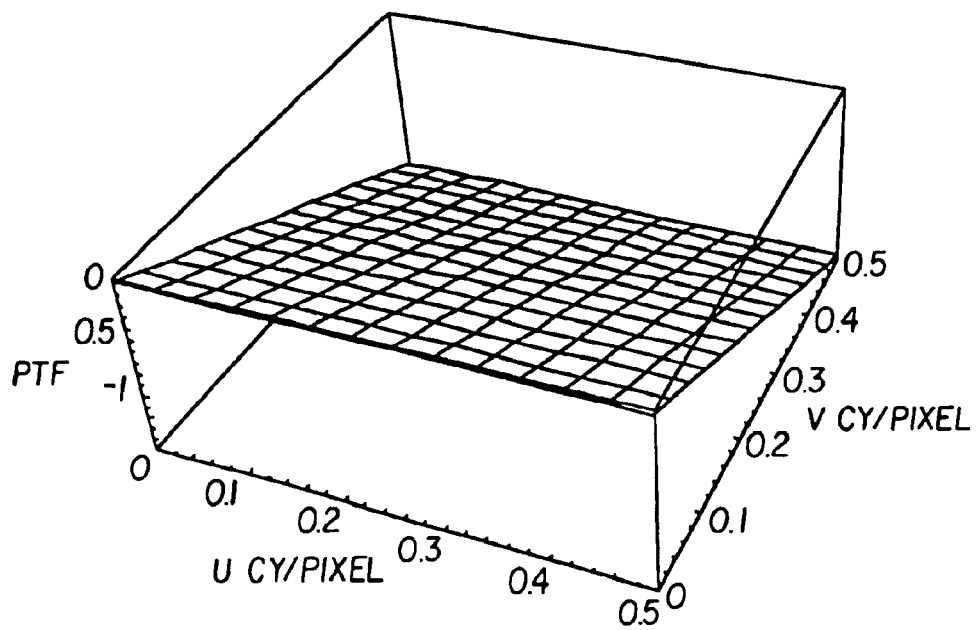
FIG. 5 is a diagram of the desired filter phase transfer function (PTF) for correcting color misregistration in accordance with the invention.
Figure 8:
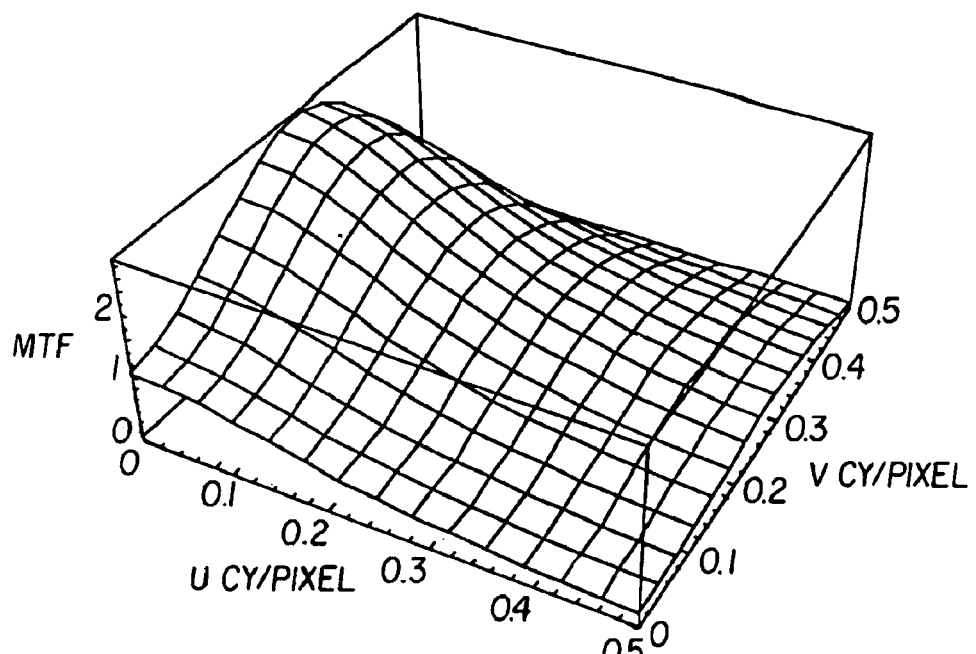
FIG. 8 is a diagram of the MTF of an actual designed 6×6 filter.
Figure 9:
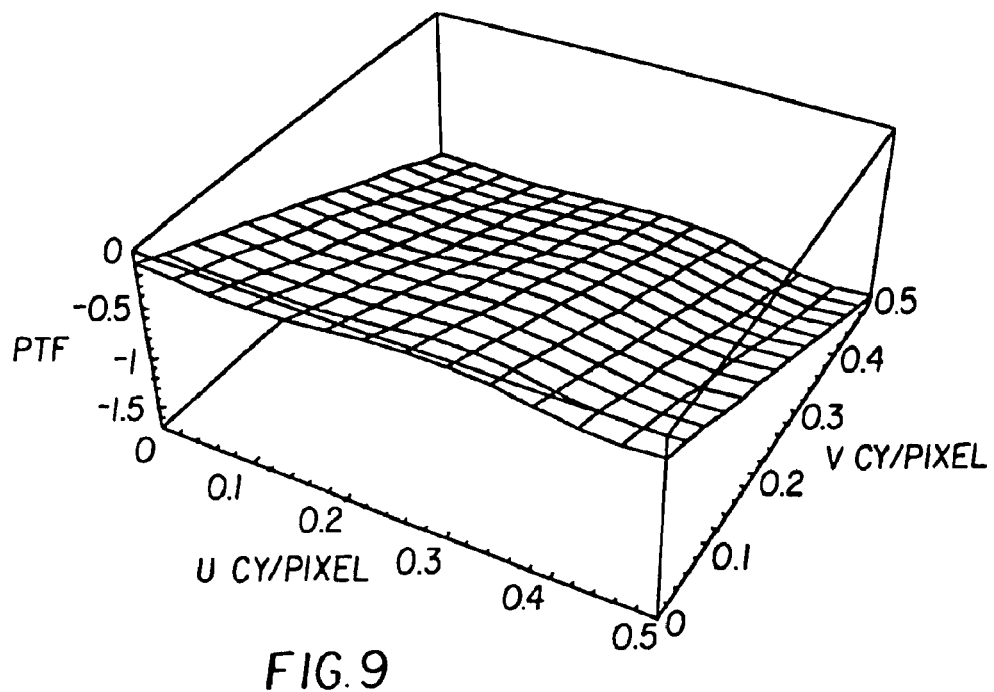
FIG. 9 is a diagram of the phase transfer function of an actual designed 6×6 filter.

The filter characteristics achieved, shown in FIGS. 8 and 9, compare well with the desired MTF and PTF, given in FIGS. 4 and 5.

The invention has been described with reference to a preferred embodiment. However, it will be appreciated that variations and modifications can be effected by a person of ordinary skill in the art without departing from the scope of the invention. In particular, it will be noted that the claimed invention can be applied to any multi-record wavelength dependent digital image. The records could, for example, represent:

red, green, blue color records cyan, magenta and yellow color records, cyan, magenta, yellow and black color records ultraviolet, visible, near infra-red, and far infra-red, or other wavelength-dependent records.

PARTS LIST 1 detection stage
2 digital filter design stage
3 digital filtering stage
4 gradient step
5 centroid step
6 equation fitting step
7 filtered data projection step
8 data storage step
9 transform step
15 color record repeat step
20 modulus storage step
22 phase function calculation
24 real and imaginary storage
26 inverse DFT computation
28 truncation
30 DFT computation
32 response evaluation
34 window function
36 filter storage
110 computer system
112 microprocessor-based unit
114 display
116 keyboard
118 mouse
120 selector
122 CD-ROM
124 CD
126 floppy disk
127 network connection
128 printer
130 PC card

What is claimed is:

1. A method for improving the wavelength dependent registration of digital images, said method comprising the steps of:

(a) detecting a similar feature in two or more digital records of the same original search digital image being wavelength-dependent, said digital records each having two dimensions;

(b) determining from the feature a shift due to misregistration of at least one of the digital records relative to another of the digital records; and (c) processing at least one of said digital records with a two-dimensional digital filter independently of the other said digital records, said digital filter having a phase response that compensates for the shift, thereby providing a correction for the wavelength-dependent misregistration between the digital records.

2. A method as claimed in claim 1 wherein step (a) comprises detecting a graphical element in each of the digital records.

3. A method as claimed in claim 2 wherein step (b) comprises computing a centroid of the graphical element.

4. A method as claimed in claim 1 wherein step (a) comprises detecting an edge feature in each of the digital records.

5. A method as claimed in claim 4 wherein step (a) further comprises elements of the spatial frequency response method for a slanted edge feature according to the ISO 12233 standard.

6. A method as claimed in claim 4 wherein step (b) comprises computing a difference in pixel location of the feature located in said at least one digital record relative to the same feature located in said another of the digital records.

7. A method as claimed in claim 1 wherein step (c) comprises processing the digital records with an FIR filter having an asymmetric response represented by a set of filter coefficients.

8. A method as claimed in claim 7 wherein step (c) comprises using a set of precalculated coefficients selected from a plurality of sets of precalculated coefficients for various pixel shifts.

9. A method as claimed in claim 1 wherein step (c) comprises processing said at least one of the digital records with digital filter having a magnitude response that compensates for an aspect of the digital records other than misregistration.

10. A method as claimed in claim 1 wherein the digital filter in step (c) is obtained by convolving a first digital filter having a phase response that compensates for the shift with a second digital filter having a magnitude response that compensates for an aspect of the digital records other than the shift.

11. A method as claimed in claim 10 wherein the second digital filter in step (c) enhances the sharpness of, or blurs the one or more of the digital records.

12. A method as claimed in claim 1 wherein the digital records are red, green and blue records.

13. A method as claimed in claim 12 wherein said another of the records in step (b) is the green color record and the red and blue color records are filtered in step (c) to correct for color misregistration between the red and blue color records and the green color record.

14. The method of claim 1 wherein said processing further comprises convolving and said digital filter is a finite impulse response filter.

15. The method of claim 1 wherein said determining further comprises estimating an edge location and edge direction of said feature.

16. The method of claim 1, wherein said feature is a registration feature.

17. The method of claim 1, wherein said feature is a neutral registration feature.

18. The method of claim 1, wherein said feature is a slanted edge registration feature.

19. The method of claim 18, wherein said slanted edge has a moderate to sharp transition on a scale at which an image sampling is to be applied.

20. A computer program product for improving the color registration of digital images comprising: a computer readable storage medium having a computer program stored thereon for performing the steps of:
(a) detecting a similar feature in two or more digital color records of the same digital image of a scene, said digital records each having two dimensions;
(b) determining from the feature a shift due to misregistration of at least one of the digital color records relative to another of the digital color records; and
(c) processing at least one of said digital color records with a two-dimensional digital filter independently of the other said digital records, said digital filter having a phase response that compensates for the shift, thereby providing a correction for the color misregistration between the digital color records.

21. A computer program product as claimed in claim 20 wherein step (a) comprises detecting a graphical element in each of the digital records.

22. A computer program product as claimed in claim 21 wherein step (b) comprises computing a centroid of the graphical element.

23. A computer program product as claimed in claim 20 wherein step (a) comprises detecting an edge feature in each of the digital color records.

24. A computer program product as claimed in claim 23 wherein step (a) further comprises evaluating the location of a slanted edge feature according to the ISO 12233 standard.

25. A computer program product as claimed in claim 23 wherein step (b) comprises computing a difference in pixel location of the feature located in said at least one digital color record relative to the same feature located in said another of the digital color records.

26. A computer program product as claimed in claim 20 wherein step (c) comprises processing the digital color records with an FIR filter not constrained to a symmetrical array, represented by a set of filter coefficients.

27. A computer program product as claimed in claim 26 wherein step (c) comprises using a set of precalculated coefficients selected from a plurality of sets precalculated for various pixel shifts.

28. A computer program product as claimed in claim 20 wherein step (c) comprises processing said at least one of the digital color records with digital filter having a magnitude response that compensates for an aspect of the digital color records other than misregistration.

29. A computer program product as claimed in claim 20 wherein the digital filter in step (c) is obtained by convolving a first digital filter having a phase response that compensates for the shift with a second digital filter having a magnitude response that compensates for an aspect of the digital color records other than the shift.

30. A method for improving the wavelength dependent registration of digital images, said method comprising the steps of:
(a) detecting a similar feature in two or more digital records of the same original search digital image being wavelength-dependent, said digital records each having two dimensions;
(b) determining from the feature a shift due to misregistration of at least one of the digital records relative to another of the digital records; and
(c) processing at least one of said digital records with a two-dimensional digital filter, said digital filter having a phase response that compensates for the shift, thereby providing a correction for the wavelength-dependent misregistration between the digital records;
wherein said determining further comprises estimating an edge location and edge direction of said feature, said edge direction being slanted relative to said two dimensions of the respective said digital record.

31. The method of claim 30 wherein said processing further comprises convolving and said digital filter is a finite impulse response filter.

32. A method for improving the wavelength dependent registration of digital images, said method comprising the steps of:
(a) detecting a similar feature in two or more digital records of the same original search digital image being wavelength-dependent, said digital records each having two dimensions;
(b) determining from the feature a shift due to misregistration of at least one of the digital records relative to another of the digital records; and
(c) processing at least one of said digital records with a two-dimensional digital filter independently of the other said digital records, said digital filter having a phase response that compensates for the shift, thereby providing a correction for the wavelength-dependent misregistration between the digital records;
wherein said determining further comprises estimating an edge location and edge direction of said feature, and wherein said edge direction is slanted relative to said two dimensions of the respective said digital record.

33. A method for improving the wavelength dependent registration of digital images, said method comprising the steps of:
(a) detecting a similar feature in two or more digital records of the same original search digital image being wavelength-dependent, said digital records each having two dimensions;
(b) determining from the feature a shift due to misregistration of at least one of the digital records relative to another of the digital records; and
(c) processing at least one of said digital records with a two-dimensional digital filter independently of the other said digital records, said digital filter having a phase response that compensates for the shift, thereby providing a correction for the wavelength-dependent misregistration between the digital records;
wherein said determining further comprises:
   computing a first derivative of said feature using a derivative filter to define one or more lines;
   computing a centroid of each of said lines; and
   fitting a linear equation to each said centroid.

34. A method for improving the wavelength dependent registration of digital images, said method comprising the steps of:
   (a) detecting an edge feature in two or more digital records of the same original search digital record being wavelength-dependent, using elements of the spatial frequency response method for a slanted edge feature according to the ISO 12233 standard;
   (b) determining from the feature a shift due to misregistration of at least one of the digital records relative to another of the digital records; and
   (c) processing said at least one of the digital records with a digital filter having a phase response that compensates for the shift, thereby providing a correction for the wavelength-dependent misregistration between the digital records.

35. A computer program product for improving the color registration of digital images comprising: a computer readable storage medium having a computer program stored thereon for performing the steps of:
   (a) detecting an edge feature in two or more digital color records of the same scene, and evaluating the location of a slanted edge feature according to the ISO 12233 standard;
   (b) determining from the feature a shift due to misregistration of at least one of the digital color records relative to another of the digital color records; and
   (c) processing said at least one of the digital color records with a digital filter having a phase response that compensates for the shift, thereby providing a correction for the color misregistration between the digital color records.

* * * * *